United States Patent
Pall et al.

(10) Patent No.: US 8,839,119 B2
(45) Date of Patent: *Sep. 16, 2014

(54) DISTRIBUTED CLIPBOARD

(75) Inventors: Gurdeep S. Pall, Medina, WA (US);
Paul W. Haverstock, Acton, MA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/955,822

(22) Filed: Nov. 29, 2010

(65) Prior Publication Data

US 2011/0072365 A1 Mar. 24, 2011

Related U.S. Application Data

(63) Continuation of application No. 11/242,606, filed on Oct. 3, 2005, now Pat. No. 7,870,493.

(51) Int. Cl.
*G06F 3/00* (2006.01)
*G06F 9/54* (2006.01)

(52) U.S. Cl.
CPC ............ *H04L 21/1822* (2013.01); *G06F 9/543* (2013.01); *G06F 9/546* (2013.01)
USPC ............................. 715/751; 715/753; 715/758

(58) Field of Classification Search
None
See application file for complete search history.

(56) References Cited

U.S. PATENT DOCUMENTS

| | | | |
|---|---|---|---|
| 5,649,105 A | 7/1997 | Aldred et al. | |
| 5,752,254 A * | 5/1998 | Sakairi | 715/209 |
| 5,926,633 A | 7/1999 | Takagi et al. | |
| 5,964,834 A | 10/1999 | Crutcher | |
| 6,209,021 B1 * | 3/2001 | Ahimovic et al. | 709/204 |
| 6,313,853 B1 * | 11/2001 | Lamontagne et al. | 715/762 |
| 6,421,733 B1 * | 7/2002 | Tso et al. | 709/246 |
| 6,473,749 B1 | 10/2002 | Smith et al. | |
| 2001/0023430 A1 | 9/2001 | Srinivasan | |
| 2001/0037367 A1 * | 11/2001 | Iyer | 709/204 |
| 2002/0075304 A1 * | 6/2002 | Thompson et al. | 345/751 |

(Continued)

FOREIGN PATENT DOCUMENTS

| | | |
|---|---|---|
| EP | 0670547 | 9/1995 |
| EP | 1076298 A2 | 2/2001 |

(Continued)

OTHER PUBLICATIONS

International Search Report for International Patent Application No. PCT/US2006/038741, Feb. 20, 2007.

(Continued)

*Primary Examiner* — Stephen Alvesteffer
(74) *Attorney, Agent, or Firm* — Andrew Smith; Peter Taylor; Micky Minhas

(57) ABSTRACT

Techniques for providing a shared clipboard to participants in a conversation are provided. The shared clipboard is specific to the conversation to which it is associated in that the shared clipboard does not "spill over" from one conversation to another. When a conversation between two or more participants is established, a shared clipboard becomes available to the participants of the conversation. The shared clipboard facilitates the sharing of data between the participants in the conversation. During the conversation, each participant in the conversation is provided access to the shared clipboard, including its contents. When a participant joins or is added to the conversation, the added participant is also provided access to the shared clipboard and its contents.

20 Claims, 7 Drawing Sheets

(56) References Cited

U.S. PATENT DOCUMENTS

| | | | |
|---|---|---|---|
| 2002/0138653 A1* | 9/2002 | Ogura | 709/246 |
| 2003/0009603 A1 | 1/2003 | Ruths et al. | |
| 2003/0154250 A1 | 8/2003 | Miyashita | |
| 2003/0182388 A1 | 9/2003 | Alexander et al. | |
| 2004/0100496 A1* | 5/2004 | Creasor et al. | 345/748 |
| 2004/0201668 A1 | 10/2004 | Matsubara et al. | |
| 2004/0210846 A1* | 10/2004 | Olsen | 715/761 |
| 2004/0224665 A1 | 11/2004 | Kokubo | |
| 2005/0028008 A1 | 2/2005 | Kumar | |
| 2005/0066335 A1 | 3/2005 | Aarts | |
| 2005/0132273 A1 | 6/2005 | Bodin et al. | |
| 2005/0154784 A1 | 7/2005 | Malcolm et al. | |
| 2005/0265548 A1 | 12/2005 | Tsuchimura | |
| 2006/0046239 A1* | 3/2006 | Allen et al. | 434/353 |
| 2006/0117178 A1* | 6/2006 | Miyamoto et al. | 713/165 |
| 2006/0155578 A1 | 7/2006 | Eisenberger et al. | |
| 2007/0011749 A1 | 1/2007 | Allison et al. | |
| 2008/0109249 A1 | 5/2008 | Paulson et al. | |

FOREIGN PATENT DOCUMENTS

| | | |
|---|---|---|
| EP | 1437656 | 7/2004 |
| GB | 2272312 | 5/1994 |
| JP | 07244720 A | 9/1995 |
| JP | 2001053785 A | 2/2001 |
| JP | 2002288087 A | 10/2002 |
| JP | 2003178015 A | 6/2003 |
| JP | 2004213271 | 7/2004 |
| JP | 2004318822 | 11/2004 |
| JP | 2005157682 A | 6/2005 |

OTHER PUBLICATIONS

European Search Report for Application No. EP 06816185.0; Applicant: Microsoft Corporation; Date of Mailing: Feb. 4, 2009; (8 pages).

* cited by examiner

US 8,839,119 B2

DISTRIBUTED CLIPBOARD

CROSS REFERENCE TO RELATED APPLICATION

This application is a continuation application of U.S. patent application Ser. No. 11/242,606, filed on Oct. 3, 2005, and entitled "DISTRIBUTED CLIPBOARD," which is incorporated herein in its entirety by reference.

BACKGROUND

Collaboration applications allow participants who are at different locations to establish and participate in a collaborative conference. Participants often present and exchange information during the conference. Typically, a presenting participant in the conference uses a video or slide projector or software to present information on a screen for viewing by the other participants at the same location as the presenting participant. But, the participants who are at the other locations are typically provided paper copies of the presentation.

The advent of computer networking has made it possible for the participants at the various locations to communicate with each other during the conference. For example, the participants of the conference at the different locations can establish network connections using their computing devices, such as laptop computers or handheld devices, and use their computing devices to share information during the conference using their computing devices.

Even though the participants are able to connect to each other, the process of sharing information is not very easy. Typically, a participant wanting to share an item of information uses a file transfer application to transmit the information to another participant. If the sharing participant wants to share the information with more than one participant, the sharing participant typically attaches the information to an email message addressed to the participants who are to receive the information and sends the email message to the addressed participants. While the information can be sent to the participants prior to the conference, often times, there will arise a need to send information during the conference, in which case the addressed participants will receive the transmitted information or email message and the attached information sometime during the conference, and will need to retrieve the shared information also during the conference. Consequently, sharing information during a conference is a source of distraction to the participants. Furthermore, sharing information amongst the conference participants during a conference is difficult and cumbersome.

SUMMARY

Techniques for providing a shared clipboard to participants in a conversation are provided. The shared clipboard is specific to the conversation to which it is associated in that the shared clipboard does not "spill over" from one conversation to another. When a conversation between two or more participants is established, a shared clipboard becomes available to the participants of the conversation. The shared clipboard facilitates the sharing of data between the participants in the conversation. During the conversation, each participant in the conversation is provided access to the shared clipboard, including its contents. When a participant joins or is added to the conversation, the added participant is also provided access to the shared clipboard and its contents.

The Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1:
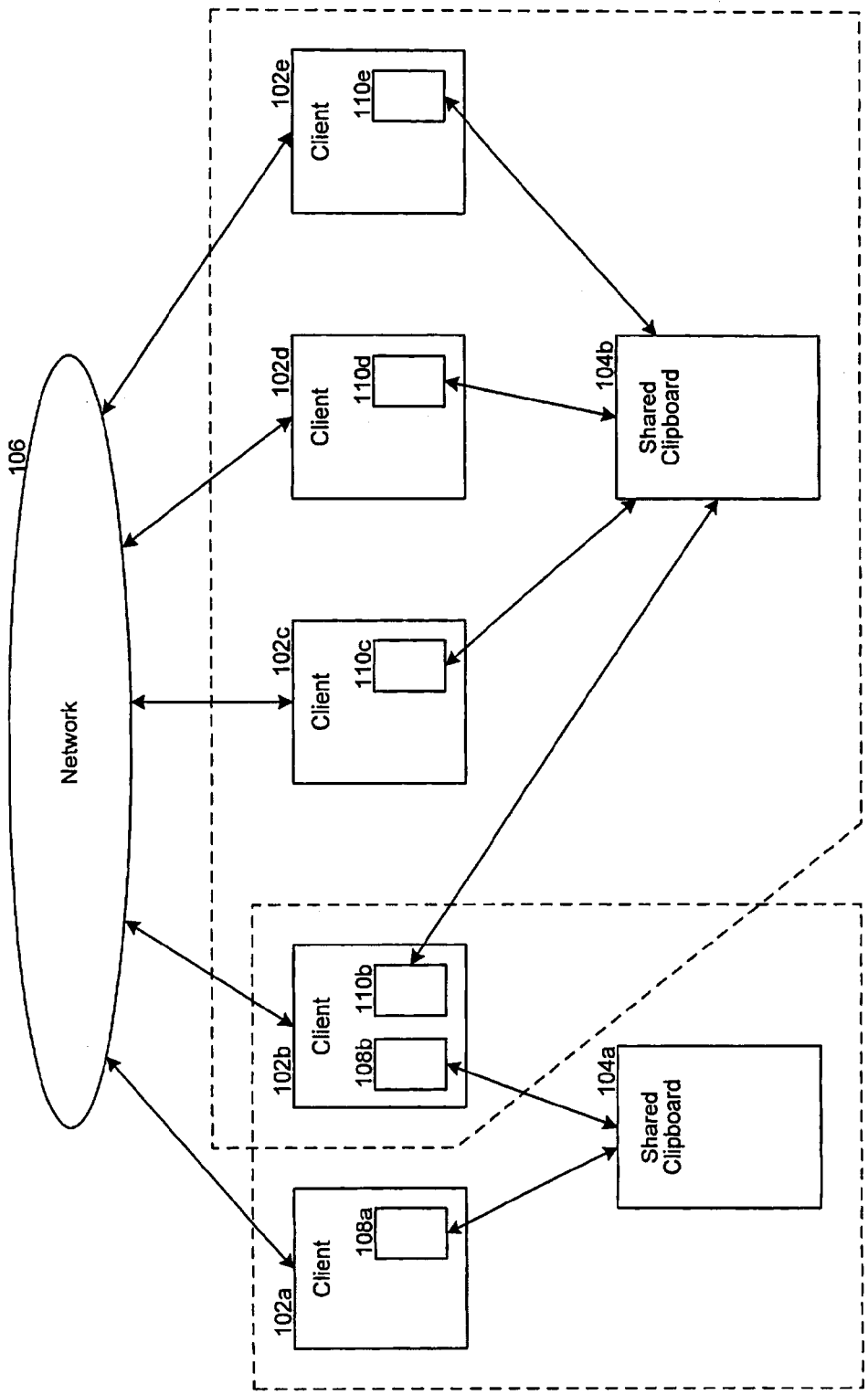
FIG. 1 is a high-level block diagram showing an environment in which the distributed clipboard may operate.

Various techniques for providing a shared clipboard to participants in a conversation are provided. The shared clipboard is specific to the conversation to which it is associated in that the shared clipboard does not "spill over" from one conversation to another. When a conversation, such as, by way of example, instant messaging, public switched telephone network ("pstn") telephone, web or online conferencing, audio/video conferencing, document sharing, and other forms of conferencing, between two or more participants is established, a shared clipboard becomes available to the participants of the conversation. During the conversation, each participant in the conversation is provided access to the shared clipboard, including its contents. When a participant joins or is added to the conversation, the added participant is also provided access to the shared clipboard and its contents. When a participant in a conversation leaves the conversation, this participant is no longer provided access to the shared clipboard. When the conversation ends, the participants in the conversation may no longer be provided access to the shared clipboard.

In some embodiments, a client collaboration application creates a shared clipboard for use by a participant in a conversation upon establishing or creating the conversation. The client collaboration application that is executing on the client computing system, and which is used by the participant to participate in the conversation may provide its participant a conceptual view of the shared clipboard. Conceptually, there is one shared clipboard for a conversation to which each participant in the conversation shares access. For example, the client collaboration application may provide a visual rendering of the shared clipboard as a delimited or separate extension of an existing clipboard on the client computing system. In another example, the client collaboration application may provide a rendering of the shared clipboard as a separate clipboard associated with, for example, a user interface of the client collaboration application. The rendering of the shared clipboard on the client computing system can be made visual.

The participants in a conversation may access the contents of the shared clipboard by interacting with the visual rendering of the shared clipboard on their client computing systems. For example, participants in a conversation may place an object (i.e., item of information) on the shared clipboard by placing the object on the visual rendering of the shared clipboard on the client computing system. Participants in the conversation may then retrieve a copy of an object on the shared clipboard by performing a retrieval operation on the object from the visual rendering of the shared clipboard on the client computing system. In some embodiments, the shared clipboard may coordinate itself with one or more other clipboards, such as a system clipboard, on the client computing system. In this instance, the participants can access the contents of the shared clipboard using existing system clipboard commands paste (e.g., CTRL-C) and paste (e.g., CTRL-V). For example, one participant in a conversation may copy using CTRL-C a range of cells from a spreadsheet they have shared with all participants via application sharing allowing the other participants to paste the range into their various local spreadsheet files using CTRL-V. In this scenario, a visual representation of the shared clipboard need not be displayed.

In this manner, the collection of the shared clipboards on each of the client computing systems used by the participants in a conversation comprise or make up the distributed shared clipboard for the conversation.

In some embodiments, the client collaboration application may periodically "refresh" the shared clipboard (whether the shared clipboard is visually rendered or not visually rendered on the client computing system) to provide an accurate view of the contents on the shared clipboard. For example, a client collaboration application of a participant in a conversation may periodically query the client collaboration applications of the other participants in the conversation for information regarding the rendering of the shared clipboard on their client computing systems.

In some embodiments, objects are checked for access rights prior to being placed on the shared clipboard. For example, an object may contain or have associated with it digital rights or other permissions that restrict the object from being shared. In these instances, if one of the participants in the conversation does not have rights to the object, the object is prevented from being placed on the shared clipboard.

In some embodiments, the contents on the shared clipboard of a conversation may be temporarily cached on a client computing system after the termination of the conversation at the client computing system. For example, the contents may be temporarily cached for a predetermined amount of time. While the contents are temporarily cached, the participant may access the "archive" of the shared clipboard to, for example, remind him or herself of what was shared, during what conversation, recall object that the participant obtained in a conversation but somehow lost, and so on.

In some embodiments, the shared clipboard on the client computing system provides "clipboard presence" information in that the shared clipboard (whether or not it is visually rendered) shows who is doing what to the shared clipboard. Clipboard presence provides a view of how the other participants in the conversation are interacting with the shared clipboard. For example, a participant in a conversation is able to see when another participant in the conversation copies an object from the shared clipboard.

In the discussion that follows, the various embodiments of the techniques for providing a shared clipboard are described in conjunction with a variety of well known operations such as "drag-and-drop," "cut," "copy," "paste," etc., and their effects on a system clipboard as supported on computing systems executing any of a variety of well-known operating systems, such as any of the MICROSOFT WINDOWS operating systems. Even though the various embodiments of the techniques for providing a shared clipboard are described in conjunction with the aforementioned operations and their effects on a system clipboard, it will be appreciated that the techniques of providing a shared clipboard are not to be limited to working only with the aforementioned operations and the system clipboard. One of ordinary skill in the art will appreciate that the techniques for providing the shared clipboard may be readily implemented on computing systems that may support operations on objects that are different than those mentioned above and/or may not support a system clipboard. For example, the operations on the shared clipboard may be provided by performing drag-and-drop operations on the visual rendering of the shared clipboard on the client computing systems (e.g., a participant in a conversation can select and object and drag the object onto the visual rendering of the shared clipboard to place the object in the shared clipboard; a participant in a conversation can select an object on the visual rendering of the shared clipboard and drag the object from the visual rendering of the shared clipboard to a desired application, object, etc. to retrieve the object from the shared clipboard).

FIG. 1 is a high-level block diagram showing an environment in which the distributed clipboard may operate. As depicted, the environment comprises a conversation 10 comprised of client computing systems 102a-b each coupled to a shared clipboard 104a, and a conversation 12 comprised of client computing systems 102b-e each coupled to a shared clipboard 104b. Client computing systems 102a-e are each coupled to a network 106. The illustrated environment is only one example of a suitable environment and is not intended to suggest any limitation as to the scope of use or functionality of the described techniques. For example, the number of conversations, and the number of client computing systems in each of the depicted conversations, are provided only for simplicity and one skilled in the art will appreciate that there may be a different number of conversations and combinations of client computing systems in each of the conversations. As used herein, the terms "connected," "coupled," or any variant thereof, means any connection or coupling, either direct or indirect, between two or more elements; the coupling of the connection between the elements can be physical, logical, or a combination thereof.

In general terms, each client computing system allows a user, such as a human user, to participate in one or more conversations. For example, a person can use a client collaboration application program that is executing on his or her client computing system to participate in a conversation or multiple conversations. As depicted in FIG. 1, two persons, each at their respective client computing system 102a and 102b, are participating in conversation 10, and four persons, each at their respective client computing systems 102b-e, are participating in conversation 20.

When a conversation starts, a shared clipboard is created and made available to the persons participating in the conversation. For example, shared clipboard 104a is made available to the persons participating in conversation 10 at client computing systems 102a and 102b. Likewise, shared clipboard 104b is made available to the persons participating in conversation 20 at client computing systems 102b-e.

The shared clipboard for a conversation is rendered on each of the client computing systems of the persons participating in the conversation. For example, as depicted in FIG. 1, shared clipboard 104a is visually rendered on client computing system 102a as a shared clipboard rendering 108a, and on client computing system 102b as a shared clipboard rendering 108b. Likewise, shared clipboard 104b is visually rendered on client computing system 102b as a shared clipboard rendering 110b, on client computing system 102c as a shared clipboard rendering 110c, on client computing system 102d as a shared clipboard rendering 110d, and on client computing system 102e as a shared clipboard rendering 110e. The rendering of the shared clipboard on the client computing system can be made visible (e.g., visually rendered) or "minimized" (e.g., rendered but not visually) to conserve screen real estate. In some embodiments, the shared clipboard may be portrayed on the client computing system as an extension of the person's (i.e., conversation participant's) existing clipboard, such as a MICROSOFT OFFICE clipboard, or other suitable clipboard provided by an application executing on the client computing system. In these embodiments, the person sees the visual rendering of the shared clipboard as an extended area of their own clipboard, but the extended area is conceptually a view onto one space, the shared clipboard of the conversation. In the instance where a person is participating in multiple conversations (for example, the person at client computing system 102b in FIG. 1), the shared clipboards for each of the conversations is portrayed on the person's client computing system.

During the conversation, anything that a participant in the conversation cuts or copies is placed on the shared clipboard for the conversation. Participants who paste during the conversation paste from the shared clipboard. As is generally known and as is generally supported by most document editing applications and most operating systems: a cut operation saves a selected part of a document or object in a temporary buffer (e.g., a clipboard) while deleting the selected part or object; a copy operation saves a selected part of a document or object in a temporary buffer while leaving the document or object unchanged; and a paste operation inserts data from the clipboard at a current position in the document, file, folder, other object, etc. When a participant leaves the conversation or the conversation ends, the shared clipboard for that conversation goes way—i.e., the shared clipboard for that conversation is no longer rendered on the participant's client computing system. When a participant joins an existing conversation, the shared clipboard for the conversation is rendered on the joining participant's client computing system, thus allowing the participant to paste from and cut/copy to the shared clipboard just as if the participant had been in the conversation from the beginning. For example, the joining participant's client collaboration application may retrieve a copy of the shared clipboard from the client collaboration application with which the joining participant's client collaboration application established a collaboration session with to join the conversation.

In some embodiments, a participant in a conversation interacts with the shared clipboard for the conversation by performing cut, copy, paste, and drag-and-drop operations on his or her client computing system while participating in the conversation. When a participant in a conversation performs a cut operation, the cut operation takes the currently selected object or objects and places them on the participant's rendering of the shared clipboard for the conversation. The participant's rendering of the shared clipboard may then push the currently selected object or objects to the system clipboard of each participant in the conversation. The participant's rendering of the shared clipboard may also push the currently selected object or objects to each conversation participant's rendering of the shared clipboard. When the conversation ends, the system clipboard of the last participant in the conversation to cut an object or objects to the shared clipboard may not be restored because the cut operation is a destructive operation, while the system clipboard for all other participants in the conversation may be restored to the state it was in when the conversation began.

When a participant in a conversation performs a copy operation, the copy operation takes the currently selected object or objects and places them on the participant's rendering of the shared clipboard. The participant's rendering of the shared clipboard may then push the currently selected objects or objects to the system clipboard of each participant in the conversation. The participant's rendering of the shared clipboard may also push the currently selected object or objects to each conversation participant's rendering of the shared clipboard. When the conversation ends, the system clipboard for the participants in the conversation may be restored to the state it was in when the conversation began.

When a participant in a conversation performs a paste operation, the paste operation inserts a copy of the object or objects on the participant's system clipboard at a current position specified by the participant. A "paste link" operation may not render a meaningful result. Pasting a link to an object instead of the object itself may not result in a meaningful link address because the systems of the other participants in the conversation are only temporarily connected by virtue of the conversation taking place, and because the shared clipboard may not persist after the conversation ends. However, the operation may be allowed in which case the system may make no attempt to resolve the link in a meaningful way.

When a shared clipboard is made visible (i.e., visibly rendered), any object can be dragged to the shared clipboard. Participants in the conversation can drag and drop anything to the shared clipboard, for example, from an entire database or file of any type to a single spreadsheet cell. Similarly, any participant in the conversation can drag an object from the shared clipboard and drop it on any application or other suitable location.

A person may participate in multiple conversations at one time. For example, the person at client computing system 102b in FIG. 1 is participating in both conversation 10 and conversation 20. Each conversation has its own shared clipboard. The extended area of the participant's clipboard that the participant sees (and that is accessible via cut, copy, paste, etc.) applies to the conversation in which the participant is currently active or participating in. In some embodiments, the participant's currently active conversation may be determined by: where is input (e.g. text chat, voice, etc.) being directed; what window representing a conversation is active; explicit user action (e.g., the participant tells the system which shared clipboard to use by where the participant drags or by selecting a conversation window or shared clipboard window prior to copying, etc.); or system queries the participant (e.g., "from which conversation do you wish to paste?").

In some embodiments, when the first conversation on a client computing system is started, the shared clipboard (i.e., the rendering of the shared clipboard) for the first conversation on the client computing system saves off the contents of the system clipboard. When the conversation ends on the client computing system, the system clipboard is restored. When the shared clipboard goes away or is cleared, any objects that have been pushed to the system clipboard by the shared clipboard are also cleared. When multiple, simultaneous conversations are taking place on a client computing system, the shared clipboards for each conversation may need to cooperate to ensure that the first shared clipboard to be created saves the system clipboard, and the last conversation to end on the client computing system restores the system clipboard.

Referring again to FIG. 1, in general terms, the network is a communications link that facilitates the transfer of electronic content between, for example, the attached client computing systems. In one embodiment, the network includes the Internet. It will be appreciated that the network may be comprised of one or more other types of networks, such as a local area network, a wide area network, a point-to-point dial-up connection, and the like. In some embodiments, the network may include one or more server computing systems. In general terms, the server computing system may facilitate the establishment of the conversation between participants at their client computing systems. For example, a calling participant's client computing system may send a request to establish a real-time session, such as an application sharing session, with a called participant to an appropriate server computing system, and the server computing system may forward the request to the called participant's client computing system. Once the requested session is established, the calling participant's client and the called participant's client may communicate through the server computing system, or directly with each other (peer-to-peer).

The client computing system may include one or more central processing units, memory, input devices (e.g., keyboard and pointing devices), output devices (e.g., display devices), and storage devices (e.g., disk drives). The memory and storage devices are computer-readable media that may contain instructions that implement the various techniques for providing a shared clipboard to participants in a conversation, described herein. In addition, the data structures and message structures may be stored or transmitted via a data transmission medium, such as a signal on a communications link. Various communication links may be used, such as the Internet, a local area network, a wide area network, a point-to-point dial-up connection, a cell phone network, and so on. One of ordinary skill in the art will appreciate that the computing systems may be of various configurations having various components.

Embodiments of the described techniques may be implemented in various operating environments that include personal computers, server computers, computing devices, hand-held or laptop devices, multiprocessor systems, microprocessor-based systems, programmable consumer electronics, digital cameras, network PCs, minicomputers, mainframe computers, distributed computing environments that include any of the above systems or devices, and so on. The computing systems may be cell phones, personal digital assistants, smart phones, personal computers, programmable consumer electronics, digital cameras, kiosks, ATMs, and so on.

The various techniques for providing a shared clipboard to participants in a conversation may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
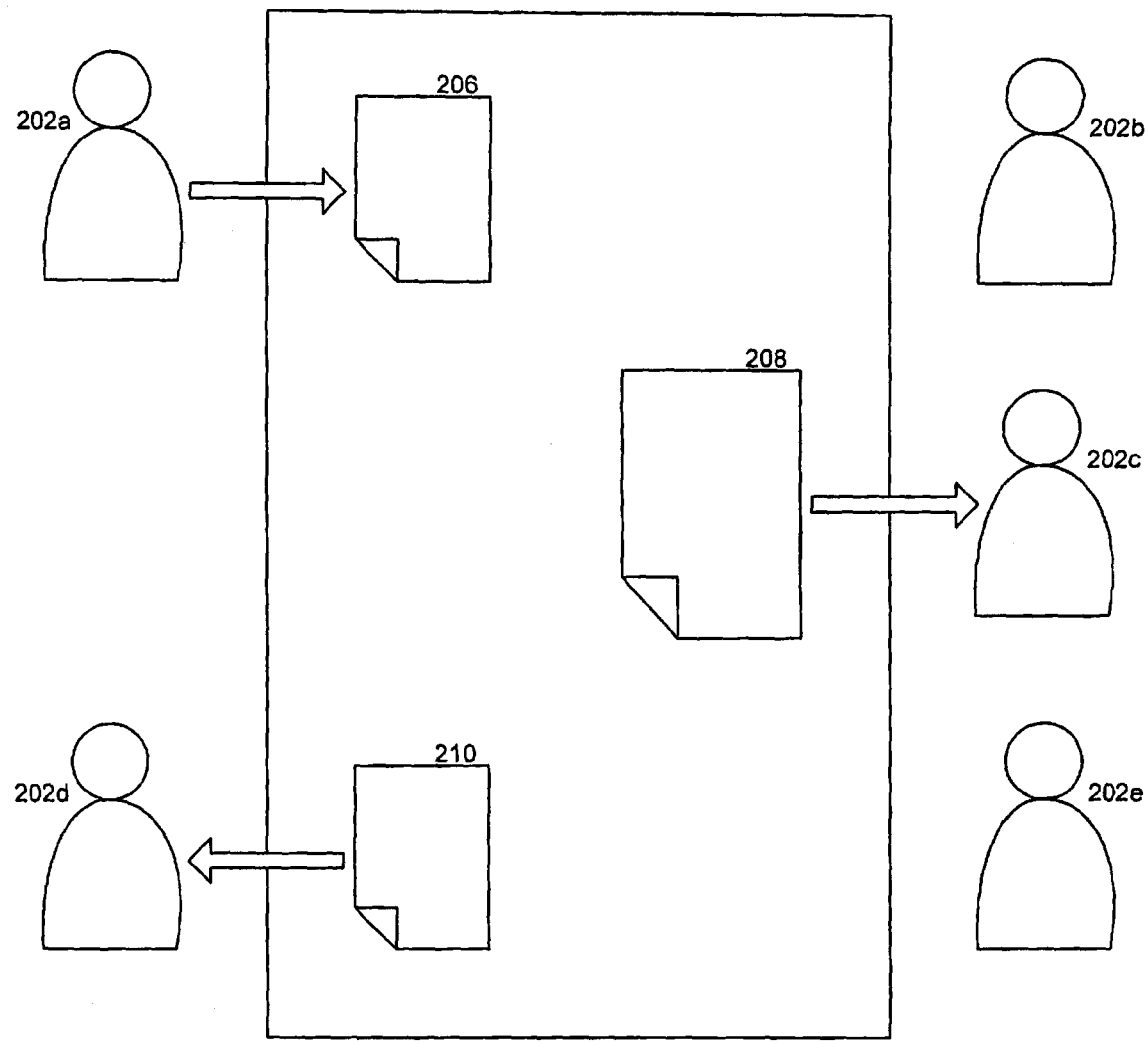
FIG. 2 is a block diagram illustrating a rendering of a shared clipboard showing clipboard presence, according to some embodiments.

FIG. 2 is a block diagram illustrating a rendering of a shared clipboard showing clipboard presence, according to some embodiments. As depicted, five participants 202a-e are shown participating in a conversation and interacting with a shared clipboard 204 that is associated with the conversation. In particular, clipboard presence indicates or shows how the participants in a conversation are interacting with the shared clipboard. Clipboard presence allows each participant in a conversation to see what each of the other participants in the conversation are doing to the shared clipboard (e.g., putting or pasting from the shared clipboard). For example, as depicted in FIG. 1, participants 202b and 202e are shown as not having interacted with the shared clipboard; participant 202a is shown as having placed object 206 on the shared clipboard; participant 202c is shown as having obtained or dragged a copy of object 208 from the shared clipboard; and participant 202d is shown as having obtained or dragged a copy of object 210 from the shared clipboard. One skilled in the art will appreciate that clipboard presence information may be depicted in a wide variety of ways. Moreover, while the clipboard presence may be depicted along with or as part of the clipboard rendering, one skilled in the art will also appreciate that the clipboard presence information may be depicted independent of the rendering of the clipboard.

Figure 3:
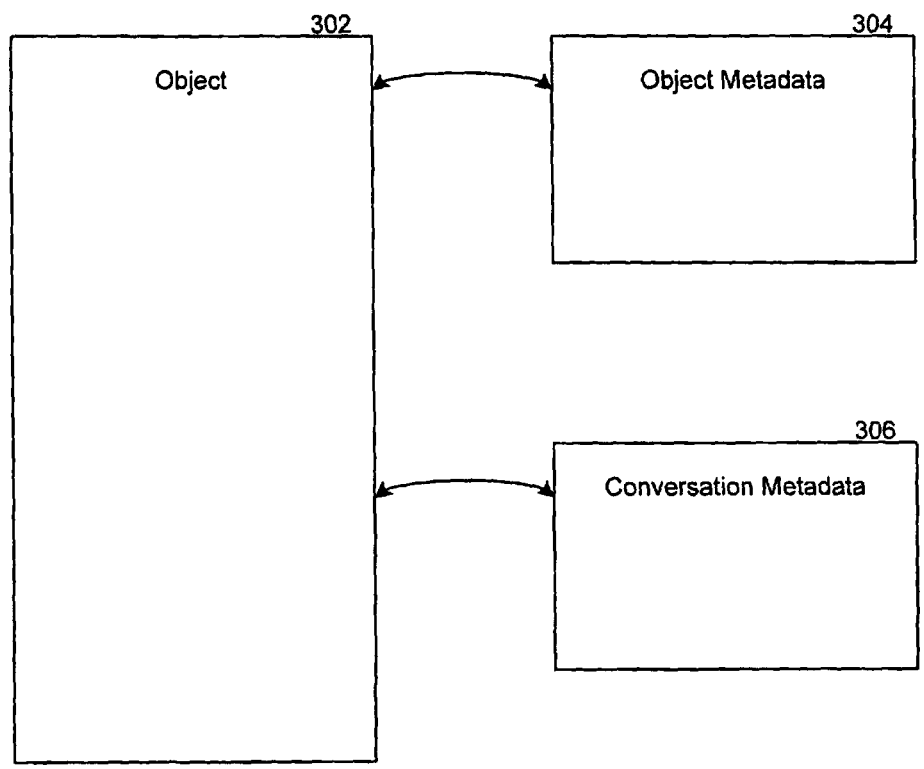
FIG. 3 is a block diagram illustrating metadata associated with an object, according to some embodiments.

FIG. 3 is a block diagram illustrating metadata associated with an object, according to some embodiments. As depicted, object 302 is associated with object metadata 304 and conversation metadata 306. Each object that is placed on the shared clipboard takes or carries with it the metadata of the file from which the object is from and the metadata of the conversation during which the object was placed on the clipboard. The object metadata may include information such as, by way of example, the type of file from which the object is from, the creator of the file, the date and time the file was created, the date and time the object was placed on the shared clipboard, etc. The conversation metadata may include information such as, by way of example, the participants in the conversation, the location of the participants in the conversation, the type of session or sessions in the conversation, the time of the conversation, etc.

Figure 4:
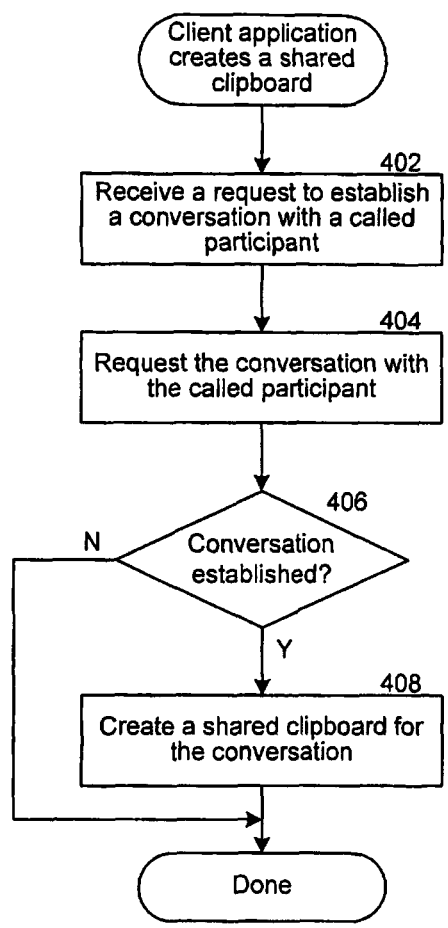
FIG. 4 is a flow diagram illustrating the creation of a shared clipboard, according to some embodiments.

FIG. 4 is a flow diagram illustrating the creation of a shared clipboard, according to some embodiments. By way of example, a calling participant may execute a client collaboration application on his or her client computing system and request to establish a conversation with a called participant, for example, at a remote client computing system. In block 402, the client collaboration application receives a request to establish a conversation with a called participant. In block 404, the client collaboration application requests the conversation with the called participant. In block 406, the client collaboration application determines whether the requested conversation with the called participant is successfully established. If the client collaboration application determines that the requested conversation was successfully established, then, in block 408, the client collaboration application creates a shared clipboard for the conversation. In some embodiments, the client collaboration application creates the shared clipboard as an extension to an existing clipboard on the client computing system, and the extension to the existing clipboard provides the calling participant a rendering of the shared clipboard for the conversation. Likewise, at the client computing device of the called participant, a client collaboration application executing on that client computing device creates a shared clipboard for the conversation, for example, as an extension to an existing clipboard on that client computing system, and the extension to the existing clipboard provides the called participant a rendering of the shared clipboard for the conversation. Thus, the shared clipboards that are created on the client computing systems of the calling participant and the called participant provide a conceptual view onto one space, which is the single shared clipboard that was created for the conversation. Conversely, if, in block 406, the client collaboration application determines that the requested conversation was not successfully established, the client collaboration application does not create a shared clipboard for the conversation.

One skilled in the art will appreciate that, for this and other processes and methods disclosed herein, the functions performed in the processes and methods may be implemented in differing order. Furthermore, the outlined steps are only exemplary, and some of the steps may be optional, combined with fewer steps, or expanded into additional steps.

Figure 5:
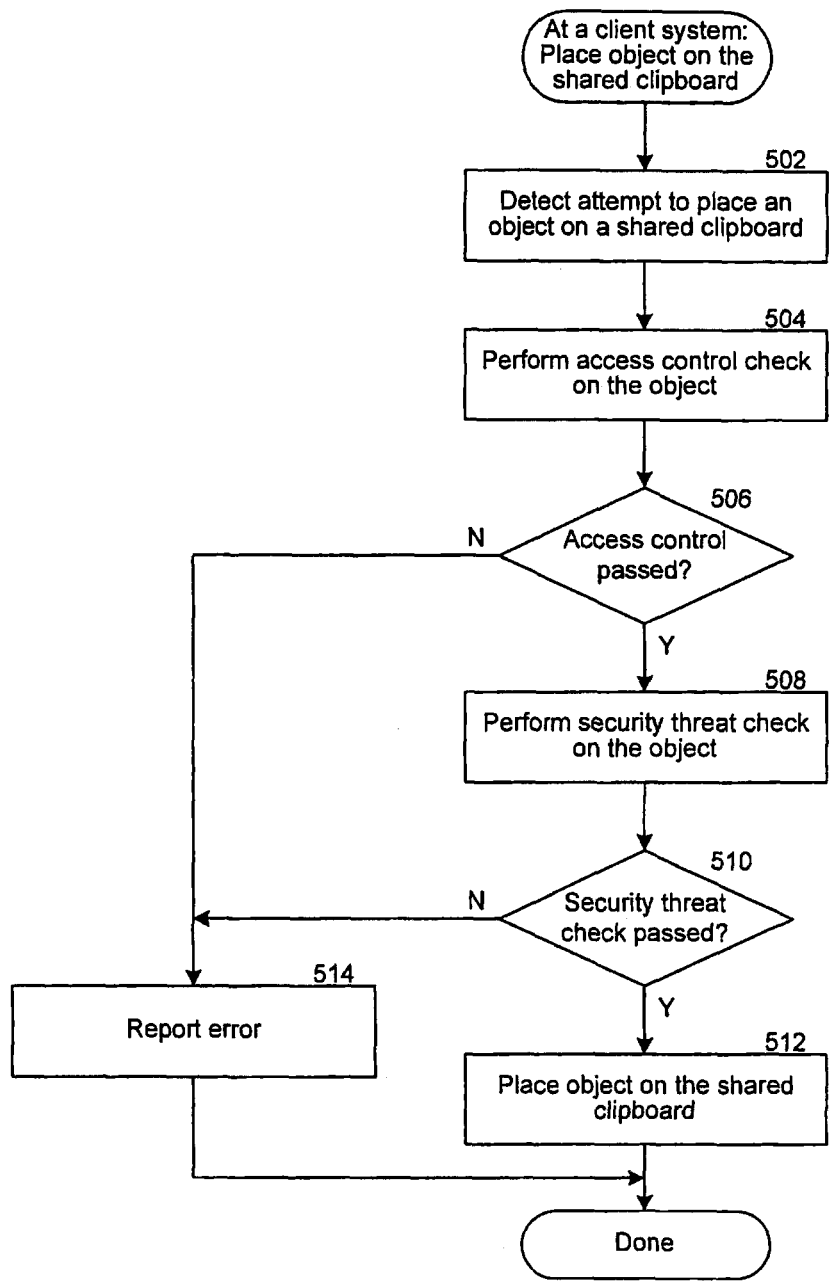
FIG. 5 is a flow diagram illustrating the placing of an object on the shared clipboard, according to some embodiments.

FIG. 5 is a flow diagram illustrating the placing of an object on the shared clipboard, according to some embodiments. In block 502, a shared clipboard for a conversation detects an attempt by a participant in the conversation to place an object on the shared clipboard. By way of example, the participant in the conversation may attempt to place an object on a visual rendering of the shared clipboard on his or her client computing system by performing, for example, a cut, copy, or drag-and-drop operation. In block 504, the shared clipboard performs an access control check on the object.

In some embodiments, the shared clipboard, by virtue of being shared, knows the identities of the participants in the conversation. Knowing the identities of the participants in the conversation, the shared clipboard is able to perform the access control check on the object to ensure that all participants in the conversation have rights to access the object. For example, the object itself may carry digital rights that restrict the current holder of the object from sharing the object (i.e., placing the object on the shared clipboard), or the object may carry or have associated with it permissions by, for example, role or user. The shared clipboard checks the digital rights and/or permissions associated with the object to ensure that all the participants in the conversation have rights to access the object prior to allowing the object to be placed on the shared clipboard.

In some embodiments, there are no permissions associated with the shared clipboard other than that the shared clipboard is shared only by the participants in the specific conversation to which the shared clipboard belongs. In these embodiments, the shared clipboard does not perform an access control check on the object, and any participant in the conversation can place objects on the shared clipboard (e.g., cut, copy, or drag) or retrieve objects from the shared clipboard (e.g., paste, or drag).

In some embodiments, the shared clipboard selectively performs an access control check. For example, some objects may know how to selectively display themselves to users based on user identity. Here, the shared clipboard may not perform an access control check on these objects, but perform an access control check on objects that do not know how to selectively display themselves to users based on user identity.

In block 506, the shared clipboard checks to determine if the access control check on the object passed. If the access control check did not pass, the shared clipboard does not allow the object to be placed on the shared clipboard and, in block 514, reports the error. For example, the shared clipboard may display a window containing an error message informing of the failed access control check on the object.

Otherwise, if, in block 506, the shared clipboard determines that the access control check passed, then, in block 508, the shared clipboard performs a security threat check on the object. In some embodiments, the shared clipboard may check for a security threat, such as, by way of example, a virus, worm, Trojan horse, or other compromising feature, by invoking, for example, a virus checking software component on the client computing system to check the object for the presence of a security threat.

In block 510, the shared clipboard checks to determine if the security threat check on the object passed. If the security threat check did not pass, the shared clipboard does not allow the object to be placed on the shared clipboard and, in block 514, reports the error. For example, the shared clipboard may display a window containing an error message informing of the failed security threat check on the object. Otherwise, if, in block 510, the shared clipboard determines that the security threat check passed, then, in block 512, the shared clipboard allows the object to be placed on the shared clipboard.

Figure 6:
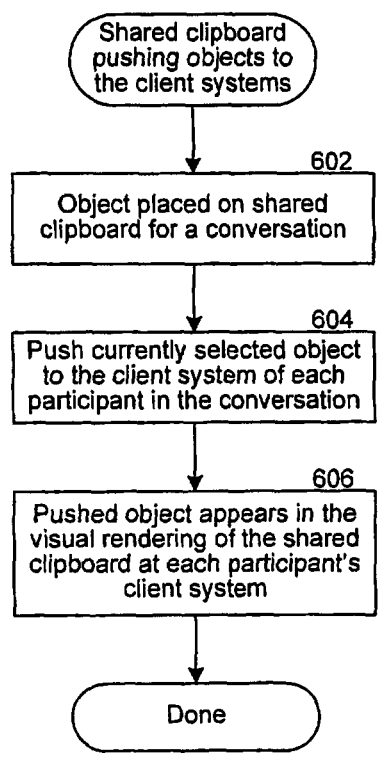
FIG. 6 is a flow diagram illustrating the pushing of an object from the shared clipboard to a client computing system, according to some embodiments.

FIG. 6 is a flow diagram illustrating the pushing of an object from the shared clipboard to a client computing system, according to some embodiments. In block 602, an object is placed on a shared clipboard for a conversation. By way of example, a participant in the conversation may have placed an object on a visual rendering of the shared clipboard on his or her client computing system. In block 604, the shared clipboard pushes the currently selected object to the client computing system of each participant in the conversation. Here, the currently selected object may be the object that the participant placed on the shared clipboard in block 602. In block 606, the pushed object appears in the visual rendering of the shared clipboard at each participant's client computing system.

In some embodiments, when a participant in a conversation places an object on the shared clipboard, an image representing the object appears on the visual renderings of the shared clipboard on the client computing systems of the participants in the conversation, and a copy of the object is written out (i.e., proactive push) to the client computing systems of the other participants in the conversation.

In some embodiments, when a participant in a conversation places an object on the shared clipboard, an image representing the object may appear on the visual renderings of the shared clipboard (i.e., lazy pull) on the client computing systems of the participants in the conversation, but a copy of the object is not written out to the client computing systems. For example, the visual rendering may be a link to the object placed on the shared clipboard. Subsequently, when a participant in the conversation retrieves an object from the visual rendering of the shared clipboard, the collaboration application on the client computing system may use the link to download or retrieve a copy of the object from the object's storage location (e.g., the client computing system of the participant that placed the object on the shared clipboard).

In these embodiments, if the participant who placed an object on the shared clipboard leaves the conversation, the object may be proactively pushed to the client computing systems of the participants in the conversation. In some embodiments, the object may be written out to a storage location that is accessible by the other participants in the conversation. In some embodiments, if the participant who placed an object on the shared clipboard leaves the conversation, the object may be represented by a "tombstone" on the rendering of the shared clipboard on the client computing systems of the participants in the conversation. The tombstone indicates that the object is no longer available to the participants in the conversation.

In some embodiments, when a participant in a conversation places an object on the shared clipboard, the object may either be proactively pushed or provided for a subsequent lazy pull operation based on the size of the object. For example, objects that are of a small size, for example, objects smaller than 10K bytes, may be proactively pushed to the client computing systems of the participants in the conversation. Conversely, if the object is larger, an image representing the object may appear on the visual renderings of the shared clipboard on the client computing systems of the participants in the conversation, but a copy of the object is not written out to these client computing systems.

Figure 7:
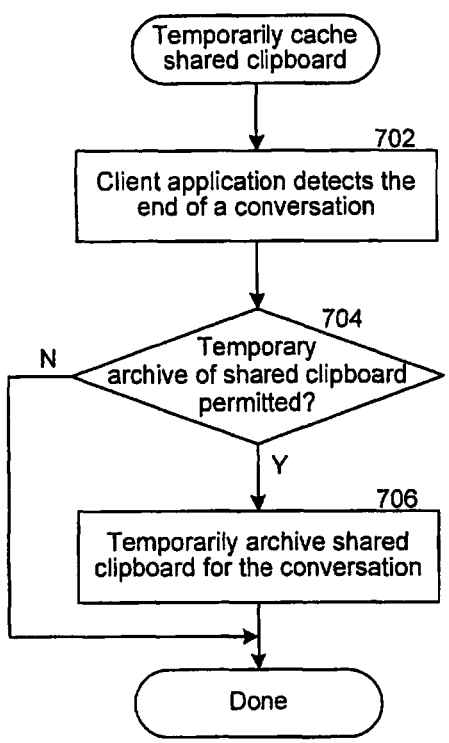
FIG. 7 is a flow diagram of illustrating the temporary caching of a shared clipboard, according to some embodiments.

FIG. 7 is a flow diagram of illustrating the temporary caching of a shared clipboard, according to some embodiments. In block 702, a client collaboration application executing on a client computing system detects the end of a conversation. In block 704, the client collaboration application checks to determine whether temporary archive of the shared clipboard for the conversation that is presently ending is permitted. If temporary archive of the shared clipboard is permitted, then, in block 706, the client collaboration application temporarily archives the shared clipboard for the conversation, for example, on a suitable memory device on the client computing system. For example, the temporary archive of the shared clipboard may be permitted if all of the participants in the conversation allowed this feature in their profiles that control their privacy. Here, the client collaboration application may query the profiles of the participants in the conversation to determine if all the participants allowed for the temporary archival of the shared clipboard. In some embodiments, the shared clipboard or other suitable process on the client computing system may check for and temporarily archive the shared clipboard for the conversation.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A method in a collaboration application for providing a shared clipboard, the method comprising:
    detecting that the collaboration application executing on a computing system has established a conversation with at least one other participant; and
    after detecting that the collaboration application has established the conversation,
        creating a shared clipboard for the conversation, wherein the shared clipboard is operable to contain an object placed by a participant in the conversation, wherein an object placed in the shared clipboard is available to the participants in the conversation; and
        enforcing access control of an object when a participant requests to place the object in the shared clipboard, the access control restricting the sharing of the object, wherein when at least one participant does have access rights to the object, but at least one participant does not have access rights to the object, preventing the object from being placed in the shared clipboard.

2. The method of claim 1 further comprising:
    detecting that the collaboration application executing on the computing system has established a second conversation with at least one other participant; and
    after detecting that the collaboration application has established the second conversation, creating a second shared clipboard for the second conversation, wherein the second shared clipboard is operable to contain an object placed by the participant in the second conversation.

3. The method of claim 1 further comprising:
    detecting that an object is placed in the shared clipboard; and
    after detecting that the object is placed on the shared clipboard, sending to the other participants in the conversation a notification of the placement of the object in the shared clipboard.

4. The method of claim 3, wherein each participant maintains a shared clipboard and the notification includes the object wherein the object is placed in each shared clipboard.

5. The method of claim 1 wherein each object has associated metadata indicating the participant that placed the object in the shared clipboard.

6. The method of claim 1 wherein when different participants have different access rights to an object in the shared clipboard, restricting access to the object in accordance with the access rights of the participants.

7. The method of claim 6 wherein the object in the shared clipboard displays itself to a participant in accordance with the access rights of the participant.

8. The method of claim 1 including before placing an object in the shared clipboard, checking the object for security threats and not placing the object in the shared clipboard when a security threat is detected.

9. A computer-readable storage device comprising instructions for controlling a computing system to provide a shared clipboard of a collaboration applications, the instructions comprising instructions of:
    a component that detects that the collaboration application executing on the computing system has established a conversation with at least one other participant; and
    a component that, after detecting that the collaboration application has established the conversation, creates a shared clipboard for the conversation, wherein the shared clipboard is operable to contain an object placed by a participant in the conversation, wherein an object placed in the shared clipboard is available to the participants in the conversation; and
    enforces access control of an object when a participant requests to place the object in the shared clipboard, the access control restricting the sharing of the object, wherein when at least one participant does not have access rights to the object, preventing the object from being placed in the shared clipboard.

10. The computer-readable storage device of claim 9 wherein the instructions further comprising instructions of;
    a component that detects that the collaboration application executing on the computing system has established a second conversation with at least one other participant; and
    a component that, after detecting that the collaboration application has established the second conversation, creates a second shared clipboard for the second conversation, wherein the second shared clipboard is operable to contain an object placed by the participant in the second conversation.

11. The computer-readable storage device of claim 9 wherein the instructions further comprising instructions of:
    a component that detects that an object is placed in the shared clipboard; and
    a component that, after detecting that the object is placed on the shared clipboard, sends to the other participants in the conversation a notification of the placement of the object in the shared clipboard.

12. The computer-readable storage device of claim 11, wherein each participant maintains a shared clipboard and the notification includes the object wherein the object is placed in each shared clipboard.

13. The computer-readable storage device of claim 9 wherein each object has associated metadata indicating the participant that placed the object in the shared clipboard.

14. The computer-readable storage device of claim 9 wherein the instructions further comprising instructions of a component that, when different participants have different access rights to an object in the shared clipboard, restricts access to the object in accordance with the access rights of the participants.

15. The computer-readable storage device of claim 14 wherein the object in the shared clipboard displays itself to a participant in accordance with the access rights of the participant.

16. The computer-readable storage device of claim 9 wherein the instructions further comprising instructions of a component that, before placing an object in the shared clipboard, checks the object for security threats and does not place the object in the shared clipboard when a security threat is detected.

17. The computer-readable storage device of claim 9 wherein the instructions further comprising instructions of a component that detects interactions by a first participant with an object that is currently in the shared clipboard and notifies other participants that the first participant has interacted with the object that is currently in the shared clipboard.

18. The computer-readable storage device of claim 9 wherein the instructions further comprising instructions of a component that, after termination of the conversation at a client system of a participant, archives the shared clipboard at the client system of the participant so that the participant can access the archived shared clipboard after leaving the conversation.

19. The computer-readable storage device of claim 9 wherein the instructions further comprising instructions of:
    a component that detects interactions by a first participant with an object that is currently in the shared clipboard and notifies other participants that the first participant has interacted with the object that is currently in the shared clipboard; and
    a component that, after termination of the conversation at a client system of the first participant, archives the shared clipboard at the client system of the first participant so that the first participant can access the archived shared clipboard after leaving the conversation.

20. A computer system for providing a shared clipboard, comprising:
    a memory storing computer-executable instructions of:
        a component that detects that the collaboration application executing on the computing system has established a conversation with at least one other participant; and
        a component that, after detecting that the collaboration application has established the conversation,
            creates a shared clipboard for the conversation, wherein the shared clipboard is operable to contain an object placed by a participant in the conversation, wherein an object placed in the shared clipboard is available to the participants in the conversation; and
            enforces access control of an object when a participant requests to place the object in the shared clipboard, the access control restricting the sharing of the object, wherein when at least one participant does not have access rights to the object, preventing the object from being placed in the shared clipboard; and
    a process that executes the instructions stored in the computer-readable memory.

* * * * *